(12) United States Patent
Cavataio

(10) Patent No.: US 7,879,231 B2
(45) Date of Patent: Feb. 1, 2011

(54) UNDER-THE-SINK REVERSE OSMOSIS WATER PURIFICATION SYSTEM WITH WATER TEMPERATURE CONTROL

(76) Inventor: Daniel B. Cavataio, 11523 W. Orchard Ct. - D, West Allis, WI (US) 53214

( * ) Notice: Subject to any disclaimer, the term of this patent is extended or adjusted under 35 U.S.C. 154(b) by 1064 days.

(21) Appl. No.: 11/649,659

(22) Filed: Jan. 4, 2007

(65) Prior Publication Data

US 2008/0164189 A1    Jul. 10, 2008

(51) Int. Cl.
*F25B 21/04* (2006.01)
(52) U.S. Cl. .................... 210/149; 210/181; 210/257.2; 62/3.7
(58) Field of Classification Search ................. 210/149, 210/181, 257.2; 62/3.2, 3.3, 3.5, 3.64, 3.7
See application file for complete search history.

(56) References Cited

U.S. PATENT DOCUMENTS

| | | | | |
|---|---|---|---|---|
| 4,585,554 A | * | 4/1986 | Burrows | 210/110 |
| 4,595,497 A | * | 6/1986 | Burrows | 210/110 |
| 4,744,220 A | * | 5/1988 | Kerner et al. | 62/3.3 |
| 4,752,389 A | * | 6/1988 | Burrows | 210/181 |
| 4,913,713 A | * | 4/1990 | Bender et al. | 62/3.61 |
| 5,626,021 A | * | 5/1997 | Karunasiri et al. | 62/3.5 |
| 5,862,669 A | * | 1/1999 | Davis et al. | 62/3.64 |
| 2005/0269254 A1 | * | 12/2005 | Roitman | 210/252 |

* cited by examiner

*Primary Examiner*—Terry K Cecil
(74) *Attorney, Agent, or Firm*—Richard S Missimer

(57) ABSTRACT

This invention is an improvement to the existing reverse osmosis water filtration systems used in under-the-sink and similar commercial applications. This improvement uses a thermally conductive liner that allows an increase of efficiency to heat or cool water within the reverse osmosis system. In addition, it includes a controller that determines the amount of cooling required without contact with the water. The controller provides slow-rate pulse-width modulation of the Peltier-like device to cool, and dependant on room temperature, potentially heat the water within the reverse osmosis system.

3 Claims, 4 Drawing Sheets

NOTE: 1) For Slow Fixed-rate Pulse-width control delete ALL optional components and use outputs A & B;
2) For Room temperature control delete T2, T3, and T4 and use outputs A & B; -or-
3) For Room Temperature control with Freeze Protection include all optional components and use outputs B & C.

UNDER-THE-SINK REVERSE OSMOSIS WATER PURIFICATION SYSTEM WITH WATER TEMPERATURE CONTROL

FIELD OF THE INVENTION

This invention is an improvement for under-the-sink reverse osmosis water purification systems that are primarily used in residential and commercial applications, specifically it is an improvement to under-the-sink reverse osmosis water purification system that incorporates a Peltier-like device for the cooling or heating of the water.

DISCUSSION OF THE RELATED ART

Water is a staple of life. We use it to quench our thirst, cook our food, and cleanse our bodies. Its applications are limitless. Contaminated water, however, may harbor pollutants that have adverse, and sometimes downright dangerous, affects. High levels of natural fluorides, for example, can lead to permanently discolored teeth; and high sulfide levels can make water practically undrinkable. Contaminated water may be the result of natural causes, weather-related disasters, such as floods or hurricanes, or even municipal water sources. Therefore, the availability of quality water in homes and businesses is a matter of national concern, as is the need for energy-efficient, cost-effective, under-the-sink water purification systems.

Under-the-sink water purification systems are a well-known art and typically incorporate a chilling means, resulting in cool, purified, and refreshing drinking water. Past designs have used mechanical refrigeration as a chilling means. Mechanical refrigeration, however, often uses complex, large machines that are noisy and expensive to operate due to their high energy consumption. Hence, mechanical refrigeration cannot be effectively used as a chilling means for under-the-sink water purification systems.

For compact, quiet, under-the-sink water purification systems, Peltier-like devices, otherwise known as thermoelectric modules, can be used as a chilling means. Thermoelectric modules generally have two sides, one hot and one cold. They are powered by voltage in direct current (or dc voltage). The thermal characteristics can be reversed by electrically reversing the voltage applied to the device. In this application the cold side is in thermal communication with the water reservoir, and the hot side is thermal communication with the free air, a heat-sink, or potentially the hot water supply or waste lines.

Examples of under-the-sink reverse osmosis water purification systems that incorporate thermoelectric modules include U.S. Pat. No. 4,585,554 to Burrows (1986); U.S. Pat. No. 4,595,497 to Burrows (1986); and U.S. Pat. No. 4,752,389 to Burrows (1988). These examples generally suffer from high tank costs (associated with the use of stainless steel), or lack efficiency (due to the use of plastic or insulative materials).

Other designs include fans for cooling the hot side of the thermoelectric heat module (as in U.S. Pat. No. 5,862,669 to Davis, et al. (1999)). Unfortunately, fans require some level of annual service to lubricate, and remove dust that accumulates. Further, fans can be noisy for under-the-sink installations, and are an additional power consumer.

More elaborate under-the-sink water purification systems that incorporate thermoelectric module uses the creation of an ice bank as a chilling means, such as, U.S. Pat. No. 5,862,669 to Davis, et al. Ice banks, however, can be hard to control and may result in line clogage or even cracked pipes due to the thermal contraction differentials between water and metals.

Still other under-the-sink water purifications systems that incorporate thermoelectric modules use water itself as the heat exchange medium, such as, U.S. Pat. No. 4,744,220 to Kerner, et al. (1988). Kerner's system comprises an insulated water reservoir, which is cooled by removing the heat from a thermoelectric module with thin sheets of water flowing across the heated surface of the device (or a heat-sink thermally connected). The drawback to such a system is the need for heat exchangers, a pump, and potentially a water (or coolant) tank or reservoir. Thus, a pump forces the cooling water to flow through the thermoelectric device's heat-sink and later into a heat exchanger to remove the heat from the cooling fluid. As a result, such an under-sink water purification system can be quite costly to operate.

SUMMARY OF THE INVENTION

This invention improves upon under-the-sink water purification systems that incorporate reverse osmosis water filtration units with thermoelectric heat modules. First, the thermoelectric module is a Peltier-like device. The Peltier-like device has a switch that allows the thermoelectric module to reverse its polarity. In other words, with a flip of a switch, the hot side can become the cold side, and the cold side can become the hot side. Thus, the water in the reservoir can be heated, as well as cooled.

Further, the Peltier-like device is electronically-enabled with slow-speed pulse-width modification. The slow-speed pulse-width modification results in a pulsing scheme that is well under 1 Hertz. This pulsing scheme is the main chilling means or heating means, depending on the Peltier-like device's polarity, and uses less energy than a typical thermoelectric heat module, which runs at a constant rate.

Also, this under-sink water purification system is in electronic communication with a temperature gauge that gauges the room's temperature, as opposed to the water's temperature. Thereby allowing the Peltier-like device to heat the water when the room freezes, and cool the water when the room overheats. Such an application is useful in areas with harsh temperatures.

Finally, the water reservoir is lined with a thermoplastic compound that is FDA-approved. This thermoplastic compound acts as a secondary chilling/heating means by pulling heat away from the water when a cooling element is applied to it, and insulating the heat when a heating element is applied to it. The end result is that the water in the reservoir requires less energy to cool/heat, and is cooled/heated in a quick, efficient, cost-effective manner.

This improved under-the-sink water purification system comprises a reverse osmosis water filtration unit with a thermally-conductive liner inside the water reservoir and a Peltier-like device for a thermoelectric module. This under-the-sink water purification system is in electronic communication with a room-temperature gauge.

The Peltier-like device uses slow-speed, pulse-width modification as a primary chilling/heating means; and can reverse its polarity to heat or cool the water reservoir. The thermally-conductive liner will pull heat away from the water when cooled, and keep heat in the water when heated and acts as a secondary chilling/heating means. Finally, the room-temperature gauge enables the Peltier-like device to heat the water when the room is cold, and cool the water when the room is hot.

DRAWINGS—REFERENCE NUMERALS

DRAWINGS —Reference Numerals

Figure 1:
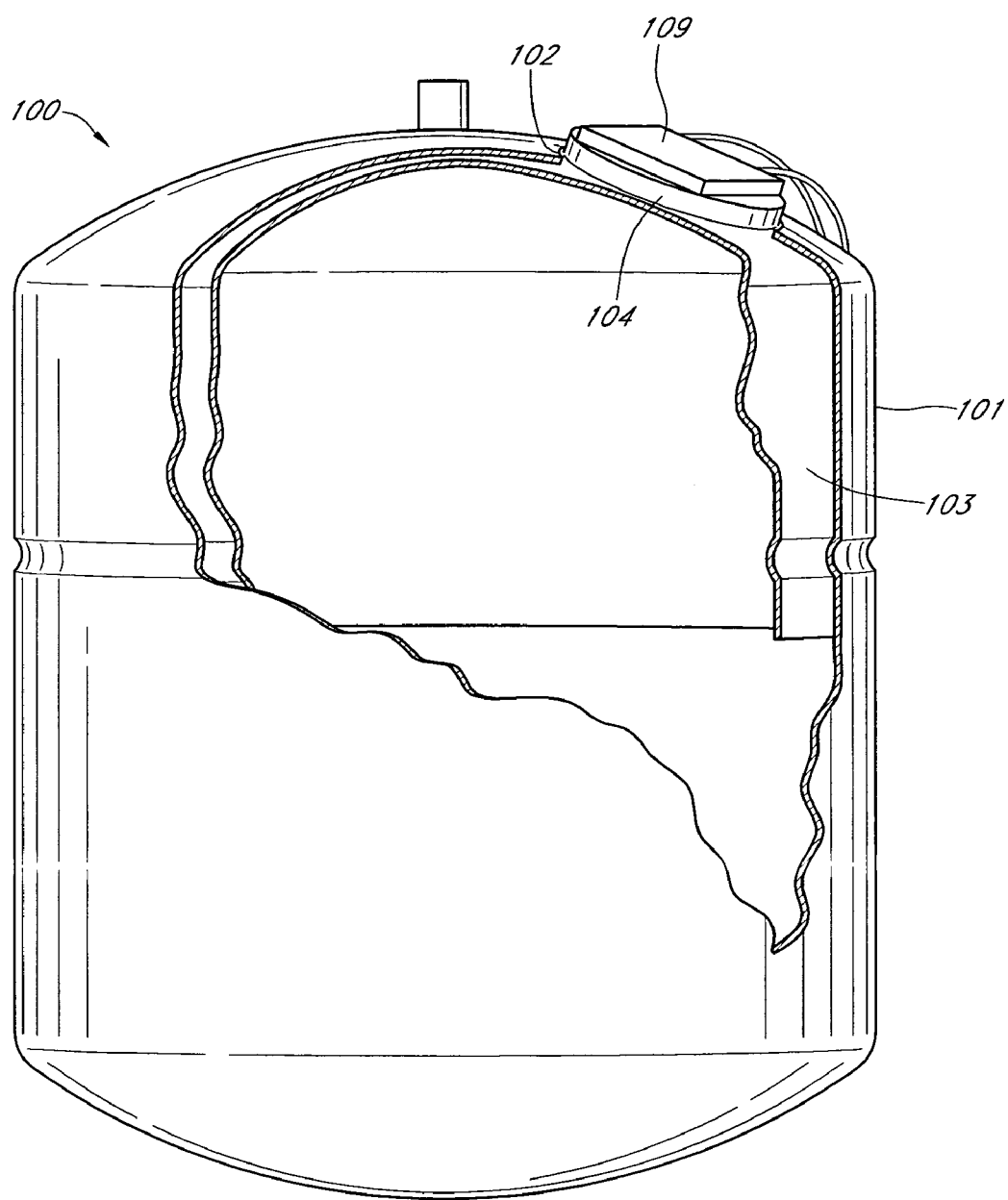
FIG. 1 A front view of a standard metal tank installation with integral cooling block, grommet, Peltier-like device, heatsink, and fan.

100 Reverse Osmosis System Tank
101 Outer Metal Tank Housing
102 Hole in tank housing for liner cooling block
103 Thermally-conductive polypropylene tank liner
104 Tank liner molded cooling block
105 Cooling block grommet
106 Butyl Diaphragm
107 Liner/Diaphragm binding ring
108 Thermal insulation
109 Peltier-like thermoelectric module
110 Heat-sink
111 Heat exchange metal plate

DETAILED DESCRIPTION AND PREFERRED EMBODIMENT

This invention is an improved under-the-sink Reverse Osmosis systems available through retail outlets and the like. As shown in FIG. 1, it consists of a thermally-conductive polypropylene tank liner 103, a Peltier-like thermoelectric module 109, a heat exchange device 111 (or heatsink 110), and an electronic control circuit (not mechanically shown) of FIG. 4 for controlling the temperature of the water within the tank.

Figure 2:
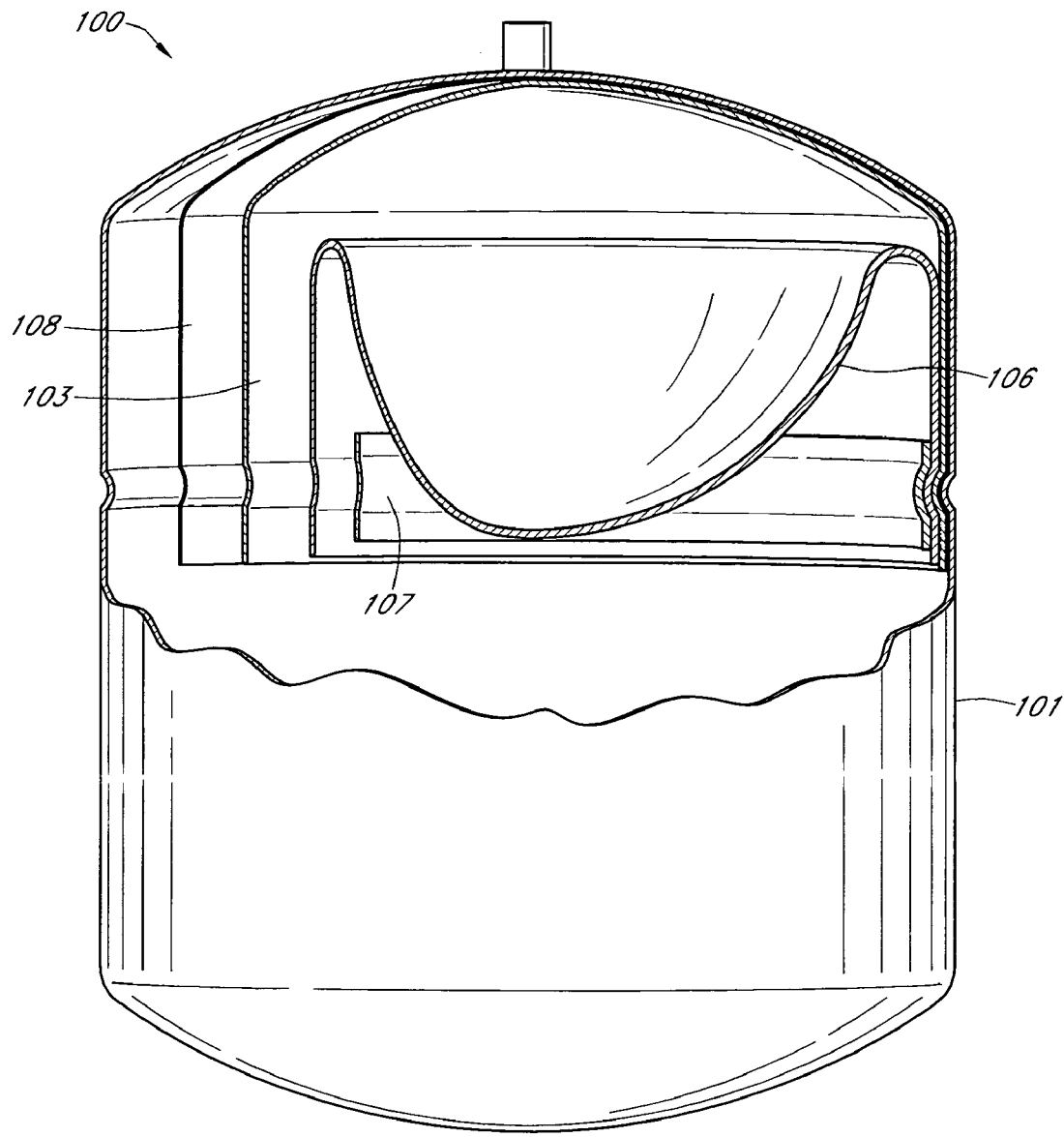
FIG. 2 Inside view of the steel outer tank with insulation, thermally enhanced tank liner, butyl diaphragm, and binding ring (cut away view).

FIG. 2 shows the inside construction where the thermally-conductive polypropylene tank liner 103 goes between the buytl diaphragm 106 and the steel outer tank 101 that has been sprayed with an insulation 108. The purpose of the insulation 108 is to reduce condensation on the outer metal tank housing 101, and increase the effectiveness of the cooling process.

Figure 3:
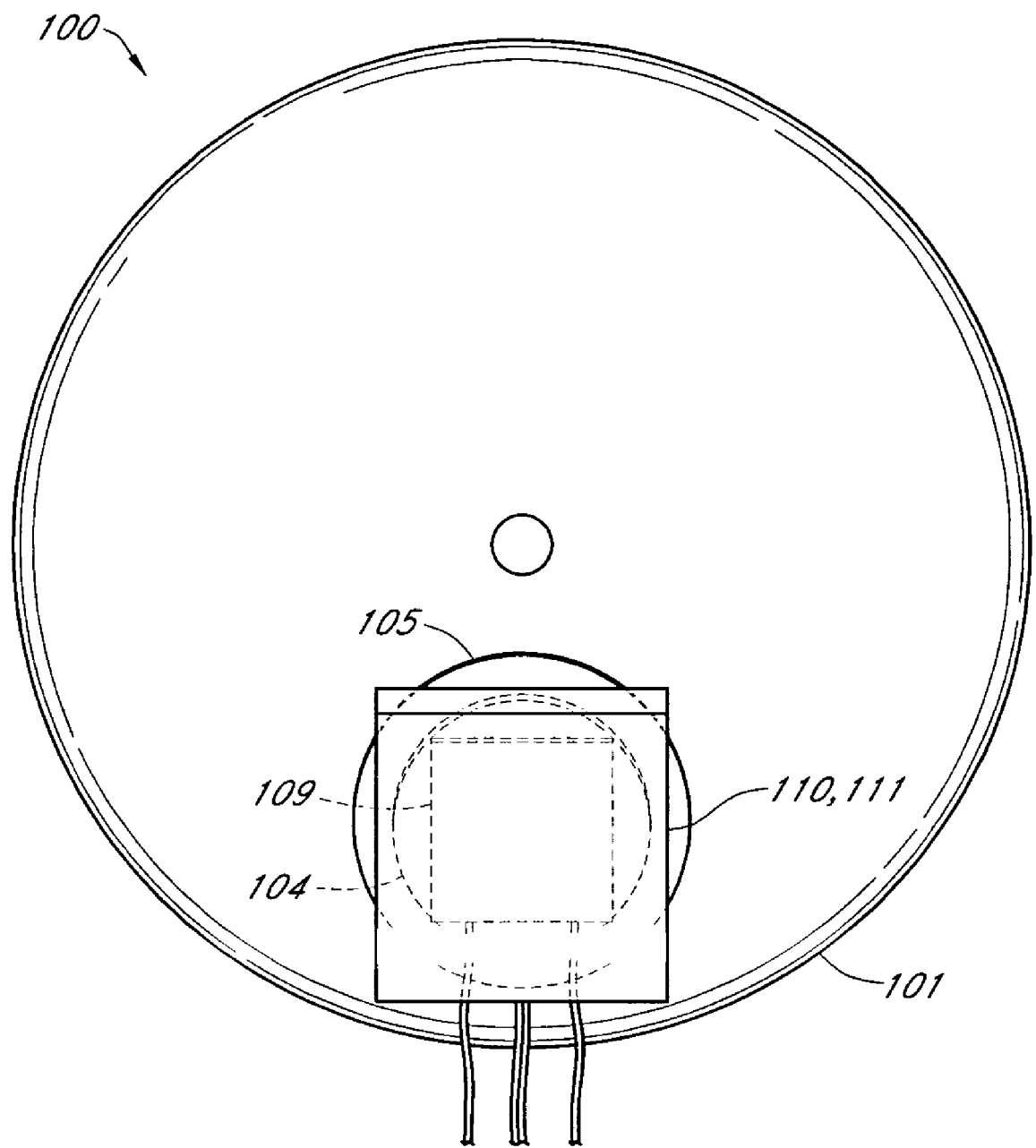
FIG. 3 Top view of the outer steel tank, cooling block, grommet, and Peltier-like device with heatsink and cooling fan.

The top view (FIG. 3) shows the cooling elements clearly. As shown, the molded cooling block 104 of the thermally-conductive polypropylene tank liner 103, exits the reverse osmosis outer steel tank through a hole protected by a grommet 105. It is then attached to the Peltier-like thermoelectric module 109, using a thermally-conductive adhesive to adhere it to the thermally-conductive polypropylene tank liner 103. Adhesion of the heatsink 110 to the Peltier-like thermoelectric module 109 is done with a thermally-conductive adhesive and attached to the outer tank for additional mechanical security.

Figure 4:
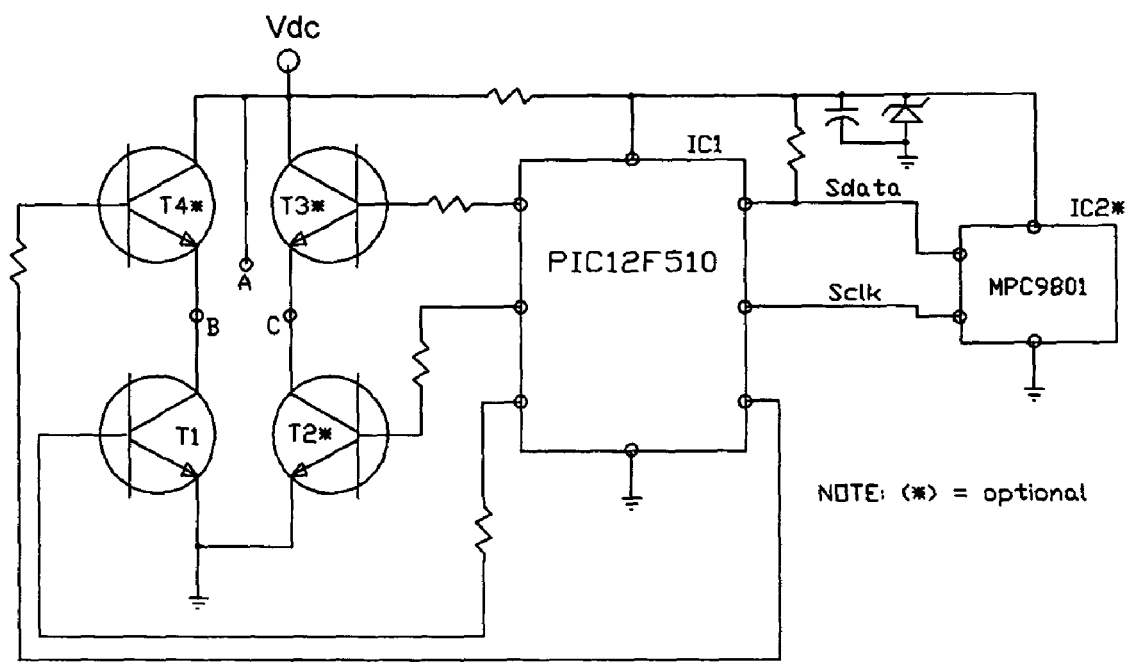
FIG. 4 Circuit diagram of a control circuit example

Lastly, a circuit board assembly that controls the cooling (or heating) process called the electronic control circuit of FIG. 4 is attached to the outer tank for convenience of connection to the tank and Peltier-like thermoelectric module 109. Such connection include: (a) two(2) wires for powering the Peltier-like thermoelectric module 109, and (b) a low-voltage power connection from a wall transformer that provides DC voltage to the electronic control circuit. This electronic control circuit includes a fixed-rate pulse-width power output (either between A and B; or between B and C) to control the Peltier-like thermoelectric module 109, a microcontroller which can take the form of a microprocessor or analog device (such as a LM555 timer) would provide the same function, and optionally a temperature probe that measures the room temperature, with an optional "H" Bridge that controls the direction of the current flow in the Peltier-like thermoelectric module 109. Such temperature reading can allow the microcontroller to adjust the rate of the pulse-width of the Peltier-like thermoelectric module 109 to provide for changes in room temperature. Further, the possibility of the room going below freezing can be measured and the polarity of the pulse-width applied to the Peltier-like thermoelectric module 109. Such polarity reversal causes the Peltier-like thermoelectric module 109 to heat the water contained in the tank instead of cooling it as is the usual process.

I claim:

1. An under-the-sink reverse osmosis water purification system comprising:
    a) a reverse osmosis water purification system designed to fit underneath a sink in a kitchen, bathroom, or other water usage area,
    b) a water reservoir, within said reverse osmosis water purification system, including a thermally-conductive liner there in;
    c) a Peltier device thermally coupled to said water reservoir liner to cool the water stored within said water reservoir liner; and
    d) a slow fixed-rate pulse-width modulated electronic control providing a pulsing scheme less than 1 hertz; whereby the temperature of the water within the system is cooled without use of water temperature measuring devices;
    whereby the efficiency of the thermal transfer to the stored water is increased.

2. An under-the-sink reverse osmosis water purification system of claim 1 further comprising:
    a room temperature measuring means that provides control to determine the proper slow-rate pulse-width control; whereby the control will maintain a cool temperature within the system without measuring devices that make contact with the water.

3. The under-the-sink reverse osmosis water purification system of claim 2 further comprising a reverse polarity control means for said Peltier device to heat said under-the-sink reverse osmosis water purification system; whereby said system will avoid freezing during winter months.

\* \* \* \* \*